UNITED STATES PATENT OFFICE 2,350,090

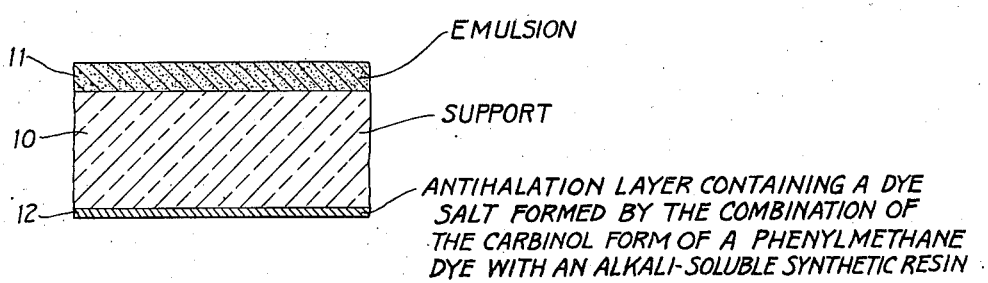

PHOTOGRAPHIC LAYERS CONTAINING DYESTUFFS

Bernard Beilenson, Harrow, England, assignor to Eastman Kodak Company, Rochester, N. Y., a corporation of New Jersey Application May 15, 1941, Serial No. 393,659
In Great Britain May 17, 1940

5 Claims. (Cl. 95—8)

This invention relates to the formation of coloured layers for use in photography, and is especially concerned with antihalation and other filter layers in photographic plates, films and similar materials.

Anti-halation backings can be formed on photographic plates and films by coating the backs of the materials with a dye-stuff containing solution of an alkali-soluble resinous or colloidal substance and drying, in which case a coloured layer is formed, which dissolves off in the alkaline developing solution eventually used. It is preferable in forming anti-halation backings in this way to use a coating solution formed by dissolving in an organic solvent a substance such as an alkali-soluble synthetic resin, e. g. an alkali-soluble polyvinyl phthalate or acetate-phthalate as described for instance in U. S. Patent 2,131,747, granted October 4, 1938, or British Specification No. 529,035 or 530,618 or an alkali-soluble hydrolysed lac, especially a soft lac (as described for instance in U. S. Patent 2,199,978, granted May 7, 1940), the dyestuff being incorporated in this solution. Such alkali-soluble colloids usually possess free acidic groups in the molecule. When it is desired to use basic dyes, for example, triphenylmethane dyestuffs, however, the difficulty arises that of these dyestuffs it is often found that those which are of the desired colour or have other desirable properties are of limited solubility in the organic solvents used in the preparation of or miscible with the coating solutions, and hence it is not an easy matter to obtain a coating solution containing sufficient of such dyestuff for a good anti-halation backing to be formed when the solution is applied to the plate or other photographic support, especially in very thin coatings. Examples of such dyes are malachite green and some magentas and some of their derivatives.

The present invention provides a method of overcoming the difficulty referred to above.

One object of my invention is to incorporate large quantities of dyes in colloid media, particularly those dyes of relatively low or medium solubility in the usual organic solvents.

Another object of my invention is to incorporate in colloid media dyes held in chemical combination therewith.

Another object of my invention is to make antihalation and filter layers which dissolve in alkaline reducing solutions such as developing solutions.

Another object of my invention is to make dyes having a reduced tendency to diffuse.

Other objects will appear hereinafter.

In the accompanying drawing the single figure is a sectional view illustrating film constructed according to my invention.

In practising the preferred form of my invention a dye-base is dissolved in a solvent in which is subsequently incorporated a colloid medium having free acidic groups in the molecule whereby some of such acidic colloid combines with the dye-base to form a salt which for convenience I term a "dye-colloidate." Thus, when the colloid chosen is a resin there is formed a dye-resinate. By "dye-base" I mean any substance (that is dye-substance) which chemically combines with an acid (for example mineral acid such as hydrochloric acid) with or without elimination of water to form a dye-salt of such acid. Hence the distinguishing feature of the dye-bases which I use is that they are salt-forming dye-bases, and the simple salts are immediately split by alkali. For example, triphenyl methane carbinols combine immediately with acids with the elimination of a molecule of water. The carbinol contains the grouping

and in the case of HCl, for example, the reaction is

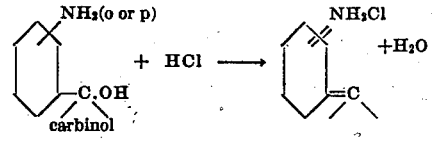

With basic dyes of the type exemplified by chrysoidine which contains an —NH₂ group the dye-salt is formed by the reaction (without elimination of water):

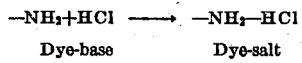

I may first form a strong solution of a dye base in a solvent and then merely mix this with a colloid medium. This method of incorporating a dye in a colloid has the advantage that the solubility of the dye in the form of its salts is of little or no consequence, and full advantage can be taken of the use of solvents in which the dye-salt has a low solubility, but in which the dye-base has a high solubility. Hence the dispersion of dye as dye-salts in colloid media is rendered easier and the colour transparency obtained is of a high order.

By using a colloid having free acidic groups so that the dye-colloidate is formed immediately the dye-base is added thereto, there results a very simple process enabling relatively large quantities of dye to be incorporated in the colloid that is to say the colloid itself after removal of solvents. This is very useful for all kinds of photographic layers which have to be very thin. Examples are extremely thin anti-halation layers (for example on plates) which are to be dissolved completely in the alkaline developer solution and the amount of colloid so dissolved is required to be kept to a minimum, for example, in automatic machine processing; very thin intermediate filter layers on multi-layer colour films; dispersion of water-insoluble colloids, especially water-permeable ones, in, for example, layers comprising gelatine where sufficient light absorption can only be obtained by having a high concentration of dye in the dispersed particles because the continuous phase does not contribute at all to the light absorption. For the purposes indicated the colloid should be one which forms a continuous film on evaporation of solvent, and is preferably colourless.

Although I may use for my invention any colloid medium having free acidic groups in the molecule, the most useful ones are those which are insoluble in plain water. In the case of such water-insoluble colloids I make a solution of the dye-base in organic solvents which are miscible with the solvents used for the water-insoluble colloid, and in which the dye-base has a very high solubility; such solution is then mixed with the solution of the colloid.

Not only does my invention give the great advantages of incorporating usually large quantities of dye in the colloid forming the layer but moreover, the chemical combination with the colloid molecule confers added freedom from dye-wandering or bleeding, which is especially apparent in the case of thin backing layers containing high concentrations of ordinary dye-salts.

According to one form of my invention, a triphenylmethane dyestuff is incorporated in a solution of the resinous or colloidal substance in the form of the carbinol base, and the dyestuff itself is then formed actually in the solution or (perhaps less suitably) in the coating formed from it. While malachite green, magenta and similar triphenylmethane dyestuffs are themselves of limited solubility in organic solvents of the type used in forming anti-halation coating solutions, the carbinol bases are many times more soluble. If the resinous or colloidal substance in the coating solution is acidic, as are alkali-soluble polyvinyl phthalates and acetate-phthalates and alkali-soluble hydrolysed soft or other lacs, the triphenylmethane dyestuff will be formed from the carbinol base immediately the latter is added to the solution. An excellent solution for forming anti-halation backings can thus be formed simply by adding the carbinol base to the solution of the acidic resinous or colloidal substance, the carbinol base being added in solution in a solvent miscible with the solvent in which the resinous or colloidal substance is dissolved. Unusually large concentrations of the dyestuff can be dispersed in the coating in this way.

*Example 1*

2 grams or more of carbinol base of malachite green dissolved in 2 cc. of methyl or ethyl Cellosolve was added to 100 cc. of a 10% solution of an alkali-soluble polyvinyl phthalate of acid value about 250–275 in methyl or ethyl Cellosolve. The dye-colloidate was immediately formed to give a highly coloured solution which could be applied to the back of a photographic plate or film and dried to form an anti-halation backing, this coating preferably being applied prior to applying the sensitive emulsion to the other side of the plate or film.

An important application or modification of my invention is in the dispersion of dyes in water-soluble colloids such as gelatine by first dispersing dye in a water-insoluble colloid and dispersing the latter in the water-soluble colloid. This enables the invention to be applied to the production of "non-curling" films where the backing constitutes a colloid such as gelatine which swells in like manner to the emulsion on the other side of the support, thus preventing curling during processing and drying. In this form of my invention I first form the dye-colloidate in a water-insoluble colloid, such as a resin (for example polyvinyl phthalate) as already described, and then disperse this as fine particles in the gelatine. An example of such a dispersion is as follows:

*Example 2*

3 g. of gelatine are dissolved in 50 cc. of water and 0.1 gr. of saponin is added. A solution is made of 0.5 g. of fuchsine carbinol base in 3 cc. of methyl Cellosolve, and this is added with rapid stirring to a 5% solution of polyvinyl phthalate in a suitable solvent, such as a mixture of acetone, methyl alcohol and methyl Cellosolve. The deep red solution of dye-resinate so obtained is now added in a thin stream to the gelatine solution which is well stirred the whole time. The mixture is then heated on the steam bath and stirred, whereby the organic solvents are removed and an excellent dispersion of the dye-resin is obtained. After filtration through cloth, the product gives, in a thin layer, good transparency and high colour brilliance with no sign of gross particles. Prolonged immersion in water gives no sign of diffusion of dye, but in the presence of alkali the colour is removed. In the presence of sodium sulphite the dye is bleached. A similar result was obtained with the carbinol base from malachite green.

*Example 3*

In a similar manner to Example 2, chrysoidine base was used, and again a very good dispersion was obtained giving a clear yellow non-diffusible layer. It washed out with alkali, but of course did not bleach in sodium sulphite.

Such layers as described in Examples 2 and 3 may be used as intermediate filter layers in multi-colour films, and for any other purpose where alkali is used in the developer, and the dye-base so formed can then be conveniently washed out. If instead of plain gelatine there is used a gelatino-silver halide emulsion, the resulting emulsion may be used for dye-bleaching purposes, such as Gaspar type (e. g., U. S. 1,985,344, granted December 25, 1934) or Christensen (U. S. A. Spec. No. 1,517,048) and in this case the first development should not be an alkaline one, for example a developer comprising amidol with sulphite but no alkali.

In the accompanying drawing which forms a part of my invention, the support 10, which may be of any suitable material such as cellulose nitrate, cellulose acetate, paper or synthetic resin, has thereon a sensitive emulsion layer 11 and an anti-halation layer 12 of gelatin containing a dye salt formed by the combination of the carbinol form of a phenyl methane dye with an alkali-soluble synthetic resin.

It will be appreciated that the higher the acid value of the colloid, such as polyvinyl phthalate, the greater is the quantity of dye base which can be used to form the dye-colloidate. In the case of the dye bases, such as carbinol of triphenylmethane dyes, which form the dye-salt by elimination of water, it is important to have present during the formation of the dye-colloidate, sufficient quantity of water-miscible solvents, such as acetone and methyl alcohol to take up the water and prevent coagulation occurring. However, it is to be observed that the use of large quantities of solvents in no way detracts from the usefulness of the invention, in enabling large concentrations of dye to be obtained in the dried layers formed therefrom.

Although it is possible to incorporate so much dye-base that all or almost all of the acidic groups of the colloid such as polyvinyl phthalate are utilised in forming dye-colloidate, such extremely high concentrations yield layers which when the dye-base was a carbinol are dissolved slowly by alkaline reducing solutions such as developing solutions, and such layers can be used where permanent filter layers are required as in light filters for lenses or safe-lights. It is to be noted that in the case of such layers made from a dye-base, such as the carbinol of magenta which forms the salt by elimination of water, the dye is not washed out by either acid, alkali or plain water, whereas in the case of a dye-base such as chrysoidine the dye is washed out with plain water or dilute acid, but not alkali.

When the layer comprising the dye-colloidate is for example an anti-halation layer which is intended to be dissolved quickly in alkaline developing solutions, it is important that some free acidic groups should remain, and we have found that it is advisable that the colloid such as polyvinyl phthalate should possess a sufficiently high acid value that after combination with the dye-base, its acid value is not lowered beyond about 150. Acid value is measured as the number of milligrams of KOH required to neutralize one gram of the colloid. For such purposes it is desirable therefore to use resins of an acid value of at least about 250. These observations apply also to the particles in the case of dispersions in, for example, gelatine, described hereinafter.

An important advantage of this form of the invention is that an anti-halation layer made in this way has all the advantages attendant upon incorporating dye in a water-insoluble resin without requiring the use of a protective coating since by dispersing the particles in gelatine or other colloid such colloid functions as the required protection. Hence a coating operation is saved. The dye-colloidates dispersed in, for example, gelatine, according to the form of the invention have the important advantage of leaving the minimum of stain on the support after the dye has been decolourised or removed.

More than one dye-base may be used in the same layer according to my invention, for example, an anti-halation layer can be made by using both malachite green or a derivative thereof and a magenta for panchromatic material or by using chrysoidine and a magenta for orthochromatic material. It may be useful in some cases to use a dye-base having solubilising groups, such as sulphonic groups, which improve still further the dispersion while the colloid molecule ensures retention of the non-diffusing properties.

I claim:

1. A sensitive photographic element comprising a support having thereon a light-sensitive emulsion layer and an unsensitive anti-halation layer containing as the light-absorbing material a dye salt formed by the combination of the carbinol form of a phenylmethane dye with an alkali-soluble synthetic resin.

2. A sensitive photographic element comprising a transparent support having on one side thereof at least one light-sensitive layer, and on the opposite side thereof an insensitive anti-halation layer containing a dye salt formed by the combination of the carbinol form of a phenylmethane dye with an alkali-soluble synthetic resin, uniformly mixed therewith as the light-absorbing medium.

3. A sensitive photographic element comprising a transparent support having on one side thereof at least one light-sensitive layer, and on the opposite side thereof an insensitive anti-halation layer containing a dye salt formed by the combination of the carbinol form of a phenylmethane dye with an alkali-soluble polyvinyl resin uniformly mixed therewith as the light-absorbing medium.

4. The method of producing an anti-halation layer for photographic film, which comprises mixing a solution of the carbinol base of a phenylmethane dye with an alkali-soluble synthetic resin having free acidic groups to form a dye-colloidate, mixing said dye-colloidate with plain gelatin, and coating it on a photographic support.

5. A photographic element comprising a support having thereon a sensitive emulsion layer containing a non-coupling dye colloidate formed by the reaction of the carbinol base of a phenylmethane dye with an alkali-soluble synthetic resin having free acidic groups.

BERNARD BEILENSON.

CERTIFICATE OF CORRECTION.

Patent No. 2,350,090. May 30, 1944.

BERNARD BEILENSON.

It is hereby certified that error appears in the printed specification of the above numbered patent requiring correction as follows: Page 2, second column, line 42, Example 2, after the word "particles" insert a period; line 65, Example 3, for "Spec. No. 1,517,048" read --Spec. No. 1,517,049--; and that the said Letters Patent should be read with this correction therein that the same may conform to the record of the case in the Patent Office.

Signed and sealed this 1st day of August, A. D. 1944.

(Seal)

Leslie Frazer

Acting Commissioner of Patents.